(12) United States Patent
Matsumoto et al.

(10) Patent No.: US 8,671,300 B2
(45) Date of Patent: Mar. 11, 2014

(54) PROCESSING UNIT, PROCESS CONTROL SYSTEM AND CONTROL METHOD

(75) Inventors: Noritaka Matsumoto, Tokai (JP);
Tsutomu Yamada, Hitachinaka (JP);
Eiji Kobayashi, Hitachinaka (JP);
Akihiro Ohashi, Mito (JP); Shin Kokura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 688 days.

(21) Appl. No.: 12/938,557

(22) Filed: Nov. 3, 2010

(65) Prior Publication Data
US 2011/0113277 A1    May 12, 2011

(30) Foreign Application Priority Data
Nov. 6, 2009  (JP) .................................. 2009-254496

(51) Int. Cl.
*G06F 1/04* (2006.01)
*G06F 1/12* (2006.01)
*G06F 15/16* (2006.01)

(52) U.S. Cl.
USPC ............................. 713/375; 714/100; 710/1

(58) Field of Classification Search
USPC ................................. 713/375; 714/100; 710/1
See application file for complete search history.

(56) References Cited

U.S. PATENT DOCUMENTS

| 6,038,615 | A | 3/2000 | Yamada et al. |
| 7,058,735 | B2 * | 6/2006 | Spencer .......................... 710/24 |
| 7,107,484 | B2 * | 9/2006 | Yamazaki et al. .............. 714/12 |
| 2006/0212754 | A1 * | 9/2006 | Yamaguchi et al. ............ 714/20 |

FOREIGN PATENT DOCUMENTS

WO     WO97/12312      4/1997

OTHER PUBLICATIONS

PCI Express®, Base Specification Revision 2.0, Dec. 20, 2006.
PCT Local Bus, PCI Hot-Plug Specification, Revision 1.1, Jun. 20, 2001.

* cited by examiner

*Primary Examiner* — Jaweed A Abbaszadeh
(74) *Attorney, Agent, or Firm* — Antonelli, Terry, Stout & Kraus, LLP.

(57) ABSTRACT

A processing unit is connected to another processing unit through a system bus composed of serial signal communication line and synchronization signal communication line to be able to communicate therewith. When an operation unit detects abnormal state in the processing unit, the operation unit supplies notification of detection of the abnormal state to synchronization unit. The synchronization unit transmits the received detection notification of abnormal state to the other processing unit through the synchronization signal communication line. Conversion unit receives parallel communication data from the operation unit through important signal line instead of general signal line and converts the received parallel signal into serial signal to be transmitted to the other processing unit through the serial signal communication line, thereby soundness among processing units connected to the system bus is ensured when the system bus is configured to attain serial communication.

16 Claims, 13 Drawing Sheets

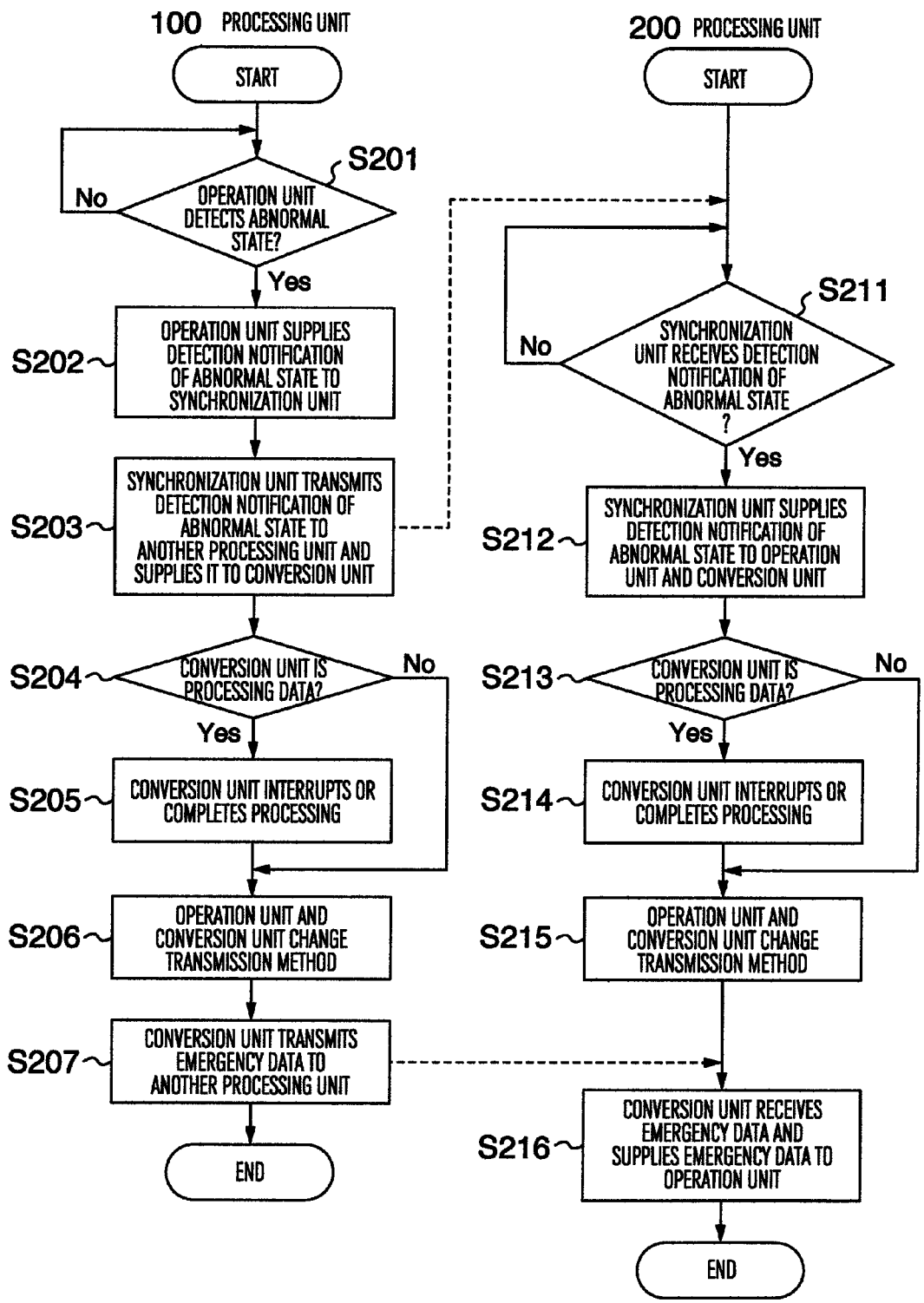

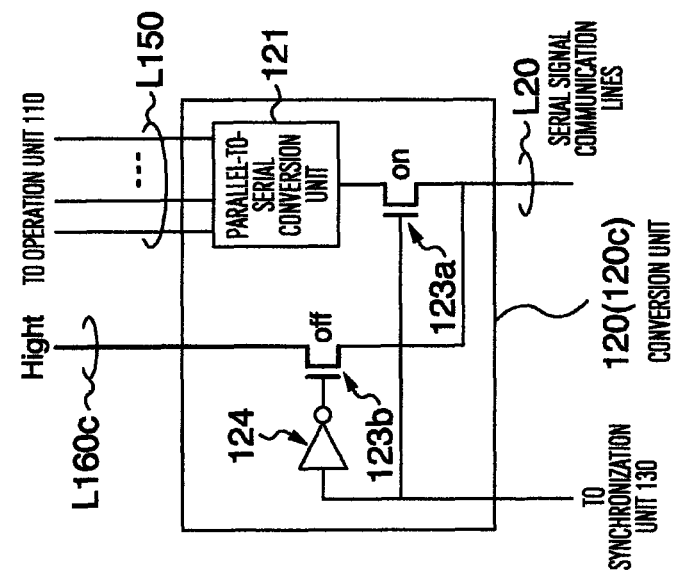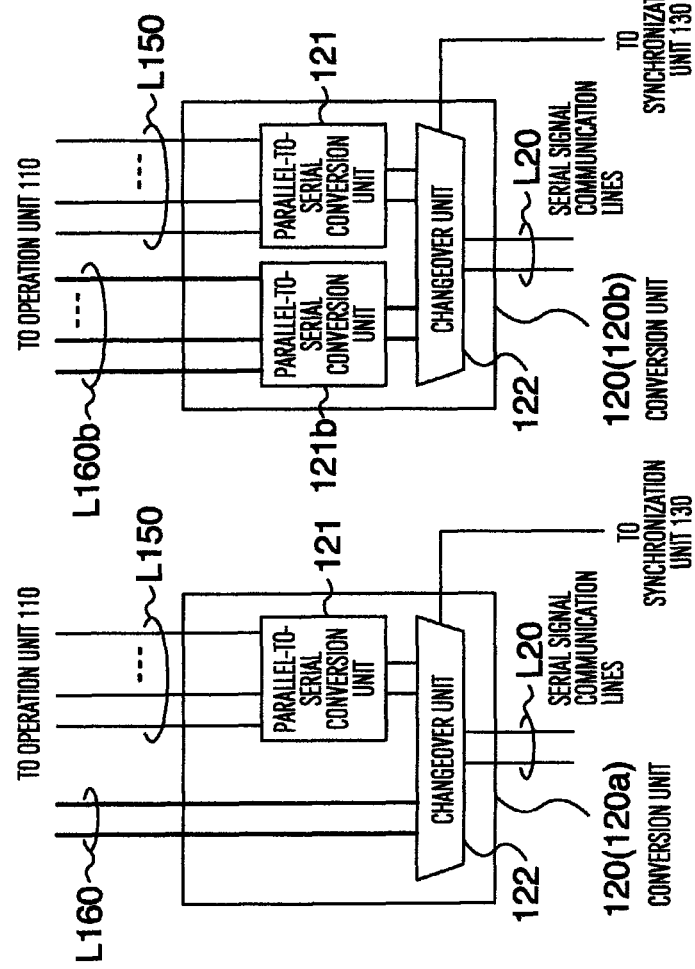

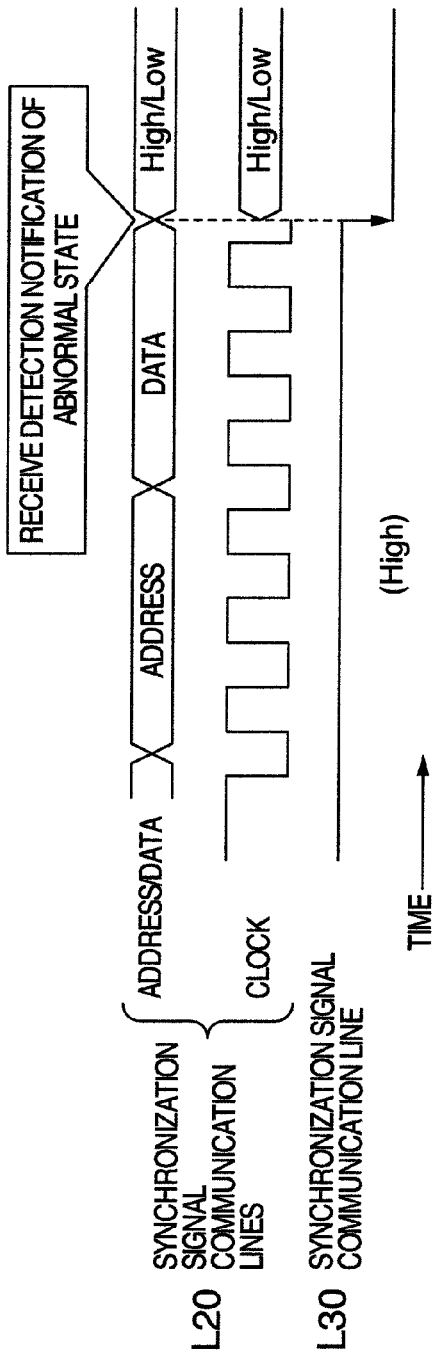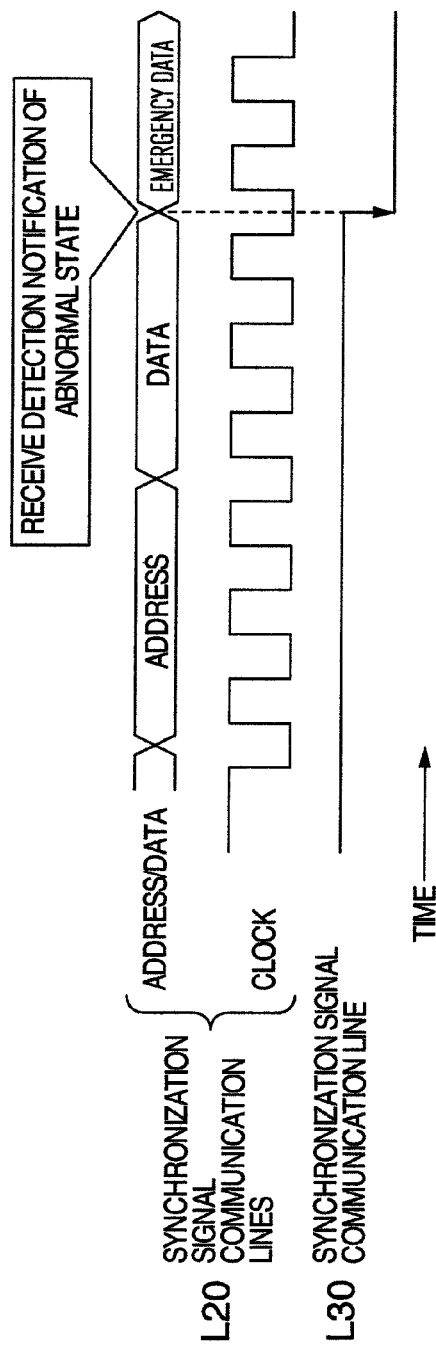

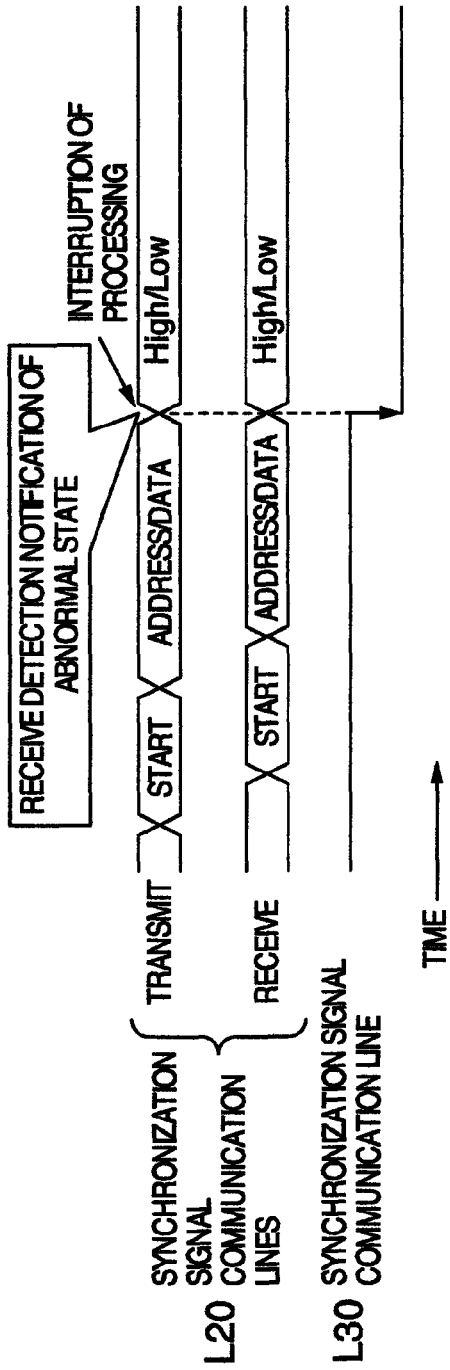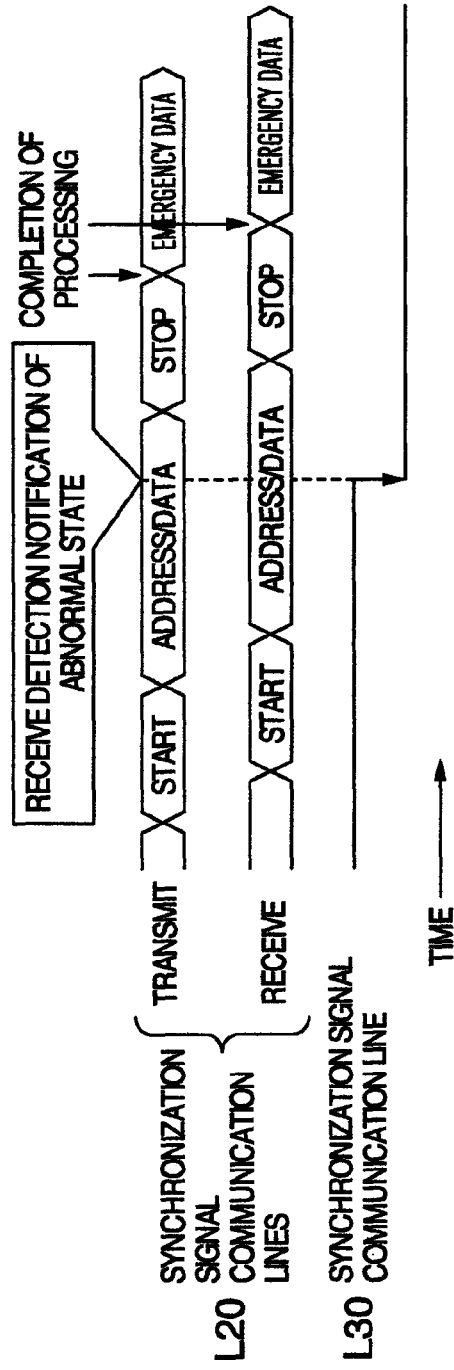

PROCESSING UNIT, PROCESS CONTROL SYSTEM AND CONTROL METHOD

INCORPORATION BY REFERENCE

The present application claims priority from Japanese application JP2009-254496 filed on Nov. 6, 2009, the content of which is hereby incorporated by reference into this application.

BACKGROUND OF THE INVENTION

The present invention relates to technique of realizing serial communication of a system bus connecting between processing units constituting a process control system which makes control while monitoring equipment.

Recently, in the field of household appliances for general use such as personal computers, the high-speed serial bus represented by SATA (Serial Advanced Technology Attachment) and PCI Express (Peripheral Component Interconnect Express) (registered trademark) is being used instead of conventional parallel bus. Furthermore, even in computer systems used in the industrial field, a demand for cost reduction is enhanced with high-speed operation, high performance and improvement of maintenance of processing units. In order to satisfy these requirements, it is studied that the system bus configured by parallel communication in the prior art is realized by serial communication.

For example, PCI-SIG and PCI Express Base Specification discloses the technique of realizing high-speed serial bus and PCI-SIG and PCI Express Base Specification and PCT International Publication WO97/12312 disclose the method of attaining hot plug using parallel bus.

SUMMARY OF THE INVENTION

However, when the system bus is configured to attain serial communication, the high-speed operation can be realized, although the security of soundness among processing units connected to the system bus (preservation method of reliability of apparatus, treatment method for abnormality of apparatus and the like) is not studied. For example, dedicated LSI (Large Scale Integration) having high-speed clock and complicated logic such as parallel-to-serial conversion is required with serial communication of system bus and accordingly it is apprehended that the soundness is reduced as compared with the parallel bus. Accordingly, it is an object of the present invention to provide technique of securing the soundness among processing units connected to a system bus when the system bus is configured to attain serial communication.

In order to solve the above problem, according to the present invention, a processing unit including an operation unit which performs operation processing comprises a synchronization unit and a conversion unit and is connected to another processing unit through a system bus composed of serial signal communication line and synchronization signal communication line. The operation unit detects abnormal state in the processing unit and supplies notification of detection of the abnormal state to the synchronization unit. The synchronization unit transmits the detection notification of abnormal state received from the operation to the other processing unit through the synchronization signal communication line and supplies the detection notification of abnormal state to the conversion unit. When the conversion unit does not receive the detection notification of abnormal state from the synchronization unit, the conversion unit receives data of operation processing result from the operation unit by parallel communication and when the conversion unit receives the detection notification of abnormal state from the synchronization unit, the conversion unit receives emergency data through important signal line for parallel communication different from signal line used for parallel communication by parallel communication. Even in any case, the received parallel signal is converted into serial signal to be transmitted to the other processing unit through the serial signal communication line.

According to the present invention, there can be provided the technique of ensuring soundness among processing units connected to the system bus when the system bus is configured to attain serial communication.

Other objects, features and advantages of the invention will become apparent from the following description of the embodiments of the invention taken in conjunction with the accompanying drawings.

BRIEF DESCRIPTION OF THE DRAWINGS

FIG. 2 is a flow chart showing process for transmitting and receiving data of process operation result by a processing unit of the first embodiment;

FIG. 3A is a diagram illustrating a conversion unit of the processing unit of the first embodiment, in which important signal line is directly connected to serial signal lines;

FIG. 3B is a diagram illustrating a conversion unit of the processing unit of the first embodiment, in which data received through important signal line is converted into serial signals;

FIG. 3C is a diagram illustrating a conversion unit of the processing unit of the first embodiment, in which switches are operated on the basis of instructions from a synchronization unit to directly connect important signal line to serial signal line;

FIG. 4A shows contents of signals in the configuration of FIG. 3A;

FIG. 4B shows contents of signals in the configuration of FIG. 3B;

FIGS. 4C and 4D show contents of signals in the configuration of FIG. 3C;

DESCRIPTION OF THE EMBODIMENTS

The embodiments of the present invention are now described in detail with reference to the accompanying drawings.

First Embodiment

Figure 1:
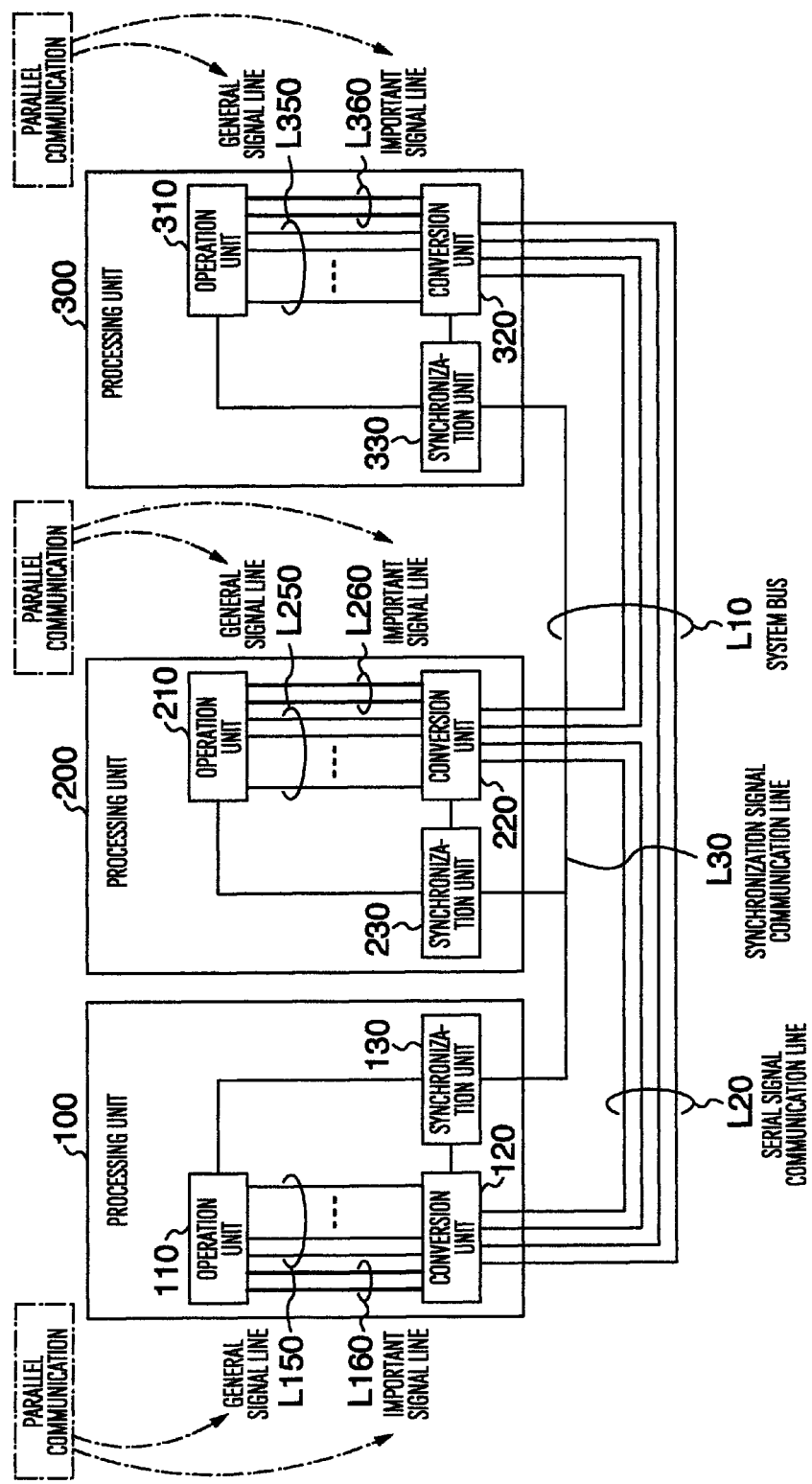
FIG. 1 is a diagram schematically illustrating an example of a process control system according to a first embodiment of the present invention.

A process control system 1 of the first embodiment includes a processing unit 100 having an operation unit 110, a processing unit 200 having an operation unit 210 and a processing unit 300 having an operation unit 310, which are connected by system bus L10. The relationship among the processing units 100, 200 and 300 may be, for example, the relationship of master and servant in which the processing unit 100 controls, manages and unifies other processing units 200 and 300 or the relationship of equality in which the processing units 100, 200 and 300 are on an equal footing. The operation units 110, 210 and 310 are constructed by processor and integrated circuits such as LSI, which execute operation processing and detect power failure, memory error and abnormal state such as insertion and extraction of another processing unit with system bus L10. Moreover, the system bus L10 is composed of serial signal communication lines L20 and synchronization signal communication line L30. The serial signal communication lines L20 connect conversion units 120, 220 and 320 of the processing units 100, 200 and 300 to each other in the peer-to-peer manner. The synchronization signal communication line L30 connects the conversion units 120, 220 and 320 of the processing units 100, 200 and 300 to each other by means of branched signal lines. In FIG. 1, three processing units 100, 200 and 300 are shown, although processing units may be 2 or 4 or more in number. Furthermore, the synchronization signal communication line L30 is 1 in number and the serial signal communication lines L20 connecting among the conversion units 120, 220 and 310 are 2 in number, although the number of lines is not limited thereto.

Further, the processing unit 100 includes conversion unit 120 and synchronization unit 130. The synchronization unit 130 receives notification of detection of abnormal state from the operation unit 110 when the operation unit 110 detects abnormal state in the processing unit 100. The synchronization unit 130 transmits the detection notification of the abnormal state to the processing units 200 and 300 through the synchronization signal communication line L30. Moreover, the synchronization unit 130 supplies the detection notification of abnormal state received from the operation unit 110 to the conversion unit 120.

The synchronization unit 130 supplies the detection notification of abnormal state to the operation unit 110 and the conversion unit 120 when the synchronization unit 130 receives the detection notification of abnormal state from the processing units 200 and 300 (other processing units) through the synchronization signal communication line L30 or when the synchronization unit 130 detects abnormality in waveform of signal transmitted through the synchronization signal communication line L30.

The conversion unit 120 receives data such as operation process result of the operation unit 110 through general signal lines L150 or important signal lines L160 by parallel communication. The important signal lines L160 are used when the operation unit 110 detects abnormal state in the processing unit 100. Further, the general signal lines L150 are used when the operation unit 110 does not detect abnormal state. That is, when the conversion unit 120 receives detection notification of abnormal state from the synchronization unit 130, the conversion unit 120 receives data (emergency data) from the operation unit 110 through the important signal lines L160 and when the conversion unit 120 does not receive detection notification of abnormal state from the synchronization unit 130, the conversion unit 120 receives data from the operation unit 110 through the general signal lines L150. The conversion unit 120 converts received parallel signal into serial signal and transmits the serial signal to the processing units 200 and 300 through the serial signal communication lines L20.

Moreover, when the conversion unit 120 does not receive detection notification of abnormal state in the processing unit 200, 300 from the synchronization unit 130, the conversion unit 120 converts data received through the serial signal communication lines L20 into parallel signal and supplies it to the operation unit 110 through the general signal lines L150. Further, when the conversion unit 120 receives detection notification of abnormal state in the processing unit 200, 300 from the synchronization unit 130, the conversion unit 120 converts data received through the serial signal communication lines L20 into parallel signal and supplies it to the operation unit 110 through the important signal lines L160.

The processing units 200 and 300 have the same configuration as that of the processing unit 100. That is, conversion unit 220, synchronization unit 230, general signal lines L250 and important signal lines L260 are the same as conversion unit 120, synchronization unit 130, general signal lines L150 and important signal lines L160 of the processing unit 100, respectively, and accordingly description thereof is omitted. Further, conversion unit 320, synchronization unit 330, general signal lines L350 and important signal lines L360 are the same as conversion unit 120, synchronization unit 130, general signal lines L150 and important signal lines L160 of the processing unit 100, respectively, and accordingly description thereof is omitted.

<Flow of Operation>

Process control operation of the processing units 100 and 200 through the system bus L10 is now described with reference to FIG. 2 (properly refer to FIG. 1). Operation flow between the processing units 100 and 200 is described here, although even if the processing unit 200 is replaced by the processing unit 300, the same operation flow is attained. Further, description is made to the case where abnormal state is detected in the processing unit 100, although if abnormal state is detected in the processing unit 200, the processing unit 100 may be replaced by the processing unit 200.

First, in step S201, it is judged whether the operation unit 110 of the processing unit 100 detects abnormal state such as power failure, memory error and insertion and extraction of another processing unit to the system bus L10. When the operation unit 110 does not detect abnormal state (No of step S201), the processing is returned to step S201. Further, when the operation unit 110 detects abnormal state (Yes of step S201), the operation unit 110 supplies notification of detection of the abnormal state to the synchronization unit 130 in step S202. The transmission method of the detection notification of abnormal state may be the method of changing (reversing) state (for example, high or low of polarity or level of signal) of signal line between the synchronization unit 130 and the operation unit 110.

In step S203, the synchronization unit 130 transmits the detection notification of abnormal state to another processing unit (processing unit 200) through the synchronization signal communication line L30. The synchronization unit 130 supplies the detection notification of abnormal state to the conversion unit 120. The transmission method of the detection notification of abnormal state may be the method of changing state of signal line in the same manner as step S202 or the method using predetermined signal waveform. In step S204, when the conversion unit 120 receives the detection notification of abnormal state, it is judged whether the conversion unit 120 is processing data or not.

When the conversion unit 120 is processing data (Yes of step S204), the conversion unit 120 interrupts the processing temporarily or completes minimum necessary processing in step S205. When the conversion unit 120 is not processing data (No of step S204), processing of step S205 is skipped.

In step S206, the operation unit 110 and the conversion unit 120 change the transmission method. Concretely, the operation unit 110 and the conversion unit 120 change to input/output data (emergency data) through the important signal lines L160 instead of the general signal lines L150. The change in the conversion unit 120 is made on the basis of the detection notification of abnormal state from the synchronization unit 130. Further, the change in the conversion unit 120 may be made on the basis of notification from the operation unit 110. In step S207, the conversion unit 120 transmits the emergency data received through the important signal line L160 from the operation unit 110 to another processing unit (processing unit 200) through the serial signal communication lines L20.

Moreover, the processing unit 200 receives the detection notification of abnormal state through the synchronization signal communication line L30 from the synchronization unit 130 of the processing unit 100 in step S203. In step S211, it is judged whether the synchronization unit 230 of the processing unit 200 receives the detection notification of abnormal state or not. When the synchronization unit 230 does not receive the detection notification of abnormal state (No of step S211), the processing is returned to step S211. Further, when the synchronization unit 230 receives the detection notification of abnormal state (Yes of step S211), the synchronization unit 230 supplies the detection notification of abnormal state to the operation unit 210 and the conversion unit 220 in step S212.

In step S213, when the conversion unit 220 receives the detection notification of abnormal state, it is judged whether the conversion unit 220 is processing data or not. When the conversion unit 220 is processing data (Yes of step S213), the conversion unit 220 interrupts processing temporarily or completes minimum necessary processing in step S214. When the conversion unit 220 is not processing data (No of step S213), the processing of step S214 is skipped.

In step S215, the operation unit 210 and the conversion unit 220 change the transmission method. Concretely, the operation unit 210 and the conversion unit 220 change to input/output data (emergency data) using the important signal lines L260 instead of the general signal lines L250. In step S216, the conversion unit 220 receives the emergency data through the serial signal communication lines L20 and supplies the emergency data to the operation unit 210 through the important signal lines L160.

<Example of Internal Configuration of Conversion Unit>

Configuration of the conversion unit 120 which performs the processing of step S206 and its detailed processing contents are now described with reference to FIGS. 3A to 3C and 4A to 4D. FIGS. 3A to 3C illustrate 3 configuration examples. In FIG. 3A, conversion unit 120a includes a parallel-to-serial conversion unit 121 which converts parallel signal on general signal lines L150 into serial signal and output of the parallel-to-serial conversion unit 121 is supplied to changeover unit 122. The important signal lines L160 are directly connected to the changeover unit 122. When the changeover unit 122 receives detection notification of abnormal state from the synchronization unit 130, the changeover unit 122 changes input from output of the parallel-to-serial conversion unit 121 to the important signal lines L160, so that emergency data is outputted onto the serial signal communication lines L20. That is, the changeover unit 122 connects the important signal lines L160 to the serial signal communication lines L20 directly, so that parallel signal on the important signal lines L160 is directly outputted onto the serial signal communication lines L20.

The relation of signals on the serial signal communication lines L20 and the synchronization signal communication line L30 in the configuration of FIG. 3A is described with reference to FIG. 4A. As shown in FIG. 4A, when the conversion unit 120a receives detection notification of abnormal state from the synchronization unit 130, the synchronization unit 130 changes polarity or level of signal on the synchronization signal communication line L30 from high to low. Before the conversion unit 120a receives detection notification of abnormal state from the synchronization unit 130 (when polarity or level of signal on the synchronization signal communication line L30 is high), the conversion unit 120a transmits bit pattern of address/data and clock through separate communication lines of serial signal communication lines L20. The address is identification information for identifying the processing units 100, 200 and 300 and corresponds to data transmission destination. After the conversion 120a receives detection notification of abnormal state from the synchronization unit 130 (when polarity or level of signal on the synchronization signal communication lines L30 is low), the important signal lines L160 are directly connected to the serial signal communication lines L20 and accordingly the conversion unit 120a transmits high/low signal (parallel signal). In the configuration of FIG. 3A, the number of serial signal communication lines L20 is required to be equal to or larger than the number of important signal lines L160.

In FIG. 3B, the conversion unit 120b includes parallel-to-serial conversion units 121 and 121b which convert parallel signals on general signal line L150 and important signal lines L160b into serial signals and outputs of the parallel-to-serial conversion units 121 and 121b are supplied o the changeover unit 122. When the changeover unit 122 receives detection notification of abnormal state from the synchronization unit 130, the changeover unit 122 changes input from output of the parallel-to-serial conversion unit 121 to output of the parallel-to-serial conversion unit 121b, so that emergency data is outputted onto serial signal communication lines L20.

The relation of signals on serial signal communication lines L20 and synchronization signal communication line L30 in the configuration of FIG. 3B is described with reference to FIG. 4B. As shown in FIG. 4B, when the conversion unit 120b receives detection notification of abnormal state from synchronization unit 130, the synchronization unit 130 changes polarity or level of signal on synchronization signal communication line L30 from high to low. Before the conversion unit 120b receives detection notification of abnormal state from synchronization unit 130 (when polarity or level of signal on synchronization signal communication line L30 is high), the conversion unit 120b transmits bit pattern of address/data and clock outputted by parallel-to-serial conversion unit 121 through separate communication lines of serial signal communication lines L20. After the conversion 120b receives detection notification of abnormal state from synchronization unit 130 (when polarity or level of signal on synchronization signal communication lines L30 is low), the conversion unit 120b transmits bit pattern and clock of emergency data outputted from the parallel-to-serial conversion unit 121b using separate communication lines. The emergency data may be transmitted using broadcast communication by setting broadcast address without designating addresses of individual destinations.

In FIG. 3C, the conversion unit 120c controls to select output of the parallel-to-serial conversion unit 121 or output on the important signal lines L160 by means of switches 123a and 123b made of CMOS (Complementary Metal Oxide Semiconductor). Further, when the signal from the synchronization unit 130 is high level representing that abnormal state is not detected, the switch 123a is turned on and the switch 123b is turned off as shown in FIG. 3C, so that data on general signal lines L150 is converted into serial signal by parallel-to-serial conversion unit 121 and is outputted onto serial signal communication lines L20. Moreover, when the signal from synchronization unit 130 is low level representing detection notification of abnormal state, the switch 123a is turned off and the switch 123b is turned on, signal on important signal lines L160 is outputted onto serial signal communication lines L20. In the configuration of FIG. 3C, the relation of signals on serial signal communication lines L20 and synchronization signal communication line L30 is the same as FIG. 4A.

In FIGS. 4A and 4B, serial communication of clock synchronization has been described and now serial communication of start-stop synchronization is described with reference to FIGS. 4C and 4D. As shown in FIGS. 4C and 4D, before the conversion unit 120 receives detection notification of abnormal state, serial communication is performed using bit pattern of start, address/data and stop. When the synchronization unit 130 receives detection notification of abnormal state, the synchronization unit 130 change polarity or level of signal on synchronization signal communication line L30 from high to low. Further, the conversion unit 120 may transmit emergency data in the form of high/low signal as shown in FIG. 4C or in the form of serial signal as shown in FIG. 4D.

When the conversion unit 120 is processing data at the time that the conversion unit 120 receives detection notification of abnormal state, the conversion unit 120 may control to transmit emergency data on important signal lines L160 immediately as shown in FIG. 4C or may control to transmit emergency data on important signal lines L160 after minimum necessary processing is completed. The transmission and reception direction of signal on serial signal communication lines L20 may be unidirectional or bidirectional of full duplex.

<Method of Setting Master Right Representing Right to Transmit Detection Notification of Abnormal State>

Figure 5:
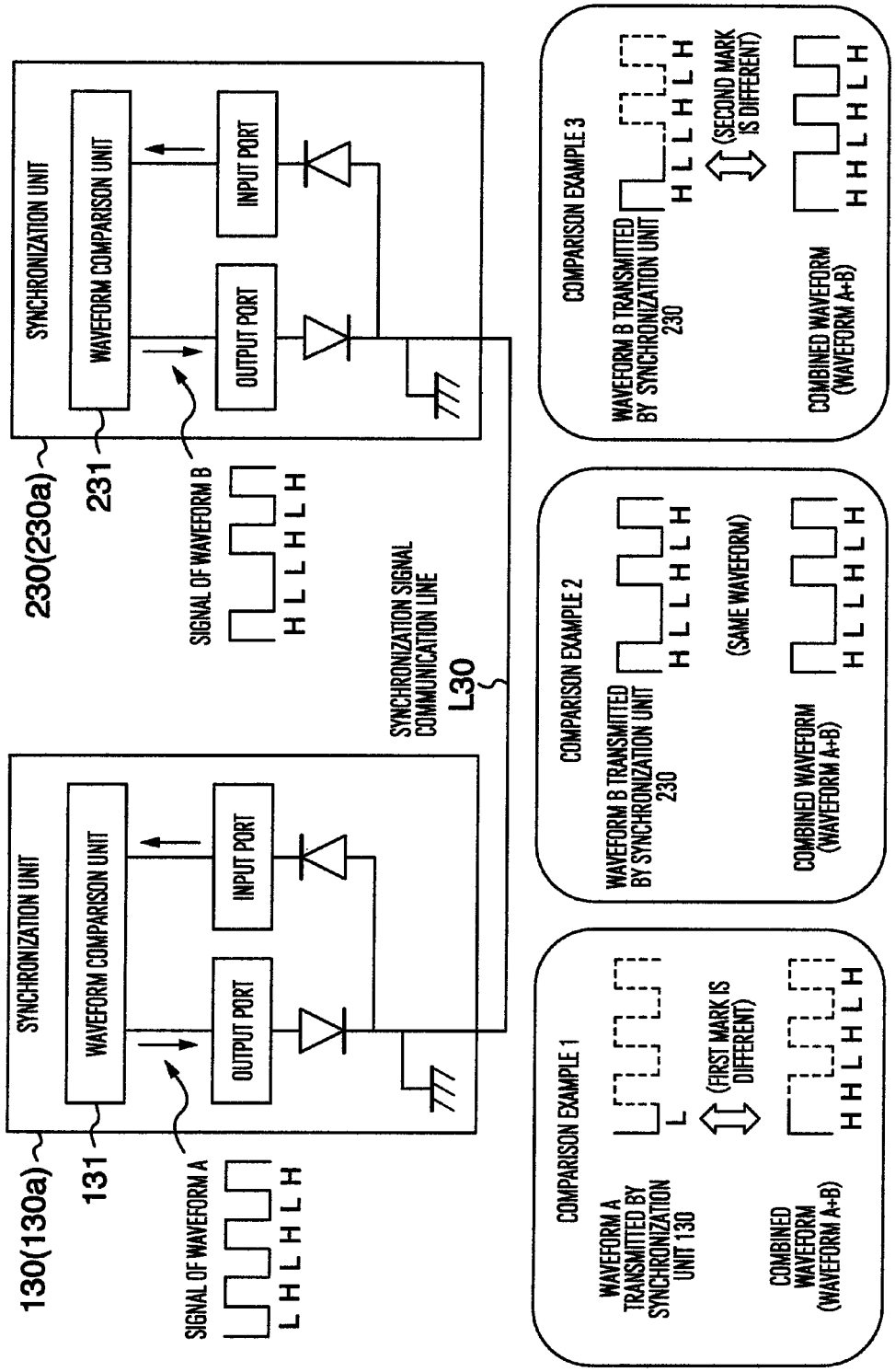
FIG. 5 is a diagram illustrating an example of a method of deciding a master right.

The processing units 100 and 200 are required to decide so that detection notification of abnormal state can be transmitted during the period that the right (master right) to transmit detection notification of abnormal state to another processing unit 100, 200 is held in order to prevent detection notification of abnormal state from competing. The setting method of the master right is described with reference to FIG. 5. FIG. 5 shows only the synchronization units 130 and 230 constituting the processing units 100 and 200.

The synchronization unit 130a of the processing unit 100 includes a waveform comparison unit 131. The waveform comparison unit 131 includes an output port from which signal having predetermined waveform A is outputted onto synchronization signal communication line L30 as detection notification of abnormal state. Further, the waveform comparison unit 131 includes an input port from which signal is received from synchronization signal communication line L30. Accordingly, the waveform comparison unit 131 can receive detection notification of abnormal state of another processing unit 200 and can also receive its own signal having the waveform A outputted onto synchronization signal communication line L30 through the output port. The synchronization unit 230a of the processing unit 200 includes a waveform comparison unit 231. The waveform comparison unit 231 performs the same operation as the waveform comparison unit 131.

For example, when the synchronization unit 130a receives waveform similar to that of outputted signal at the time that the synchronization unit 130a outputs the signal of detection notification of abnormal state, there is no other processing unit which outputs detection notification signal of abnormal state and accordingly it is understood that there is no other competing processing unit. That is, the synchronization unit 130a can recognize that the master right can be gotten. The synchronization unit 230a is also the same.

However, when the waveform comparison unit 131 of the synchronization unit 130a and the waveform comparison unit 231 of the synchronization unit 230a output detection notification of abnormal state quite simultaneously, competition occurs. It is supposed that the waveform comparison unit 131 outputs signal having waveform A onto synchronization signal communication line L30 and the waveform comparison unit 231 outputs signal having waveform B onto synchronization signal communication line L30. Accordingly, the waveform comparison units 131 and 231 receive waveform different from waveform outputted by themselves. Thus, the waveform comparison units 131 and 231 can detect occurrence of competition.

When detection notification of abnormal state is outputted by both the waveform comparison units 131 and 231 quite simultaneously, the waveform comparison units 131 and 231 receives combined waveform of waveforms A and B as shown in FIG. 5. The waveform comparison unit 131 compares waveform A and combined waveform while receiving combined waveform as shown in comparison example 1 of FIG. 5 and judges which number of mark is different. The waveform comparison unit 131 detects that first mark is different and at this time stops transmission of waveform A (as shown by broken line in comparison example 1 of FIG. 5). After the waveform comparison unit 131 stops transmission of waveform A, the combined waveform received by the waveform comparison unit 231 is similar to waveform B as shown in comparison example 2 of FIG. 5, so that the synchronization unit 230a recognizes that the synchronization unit itself gets master right.

If transmission of waveform A of the waveform comparison unit 131 cannot be stopped in time, the combined waveform is as shown in comparison example 3. The synchronization unit 230a detects that position of second mark is different and at this time stops transmission of waveform B. Then, after the synchronization units 130a and 230a stop transmission of waveforms A and B, respectively, the synchronization units 130a and 230a perform retransmission of waveforms A and B again in order to get master right. At this time, in order to avoid retransmission of waveforms A and B being performed at the same time again, different position of mark may be utilized to previously determine to shift timing of retransmission. That is, the fact that the synchronization unit 130a detects difference at position of first mark and the synchronization unit 230a detects difference at position of second mark is utilized, so that the earlier the position of detected mark is, the earlier the timing of retransmission is set. In this manner, competition can be solved.

As another method of solving competition, after both the synchronization units 130a and 230a wait random time when the synchronization units 130a and 230a detect occurrence of competition, the synchronization units 130a and 230a output detection notification signal of abnormal state repeatedly until the competition is solved so that any one of them may gets master right. The getting method of master right described above is not limited to the case where there are two processing units 100 and 200 as shown in FIG. 5 and can be applied to the case where there are three or more processing units similarly.

Second Embodiment

Figure 6:
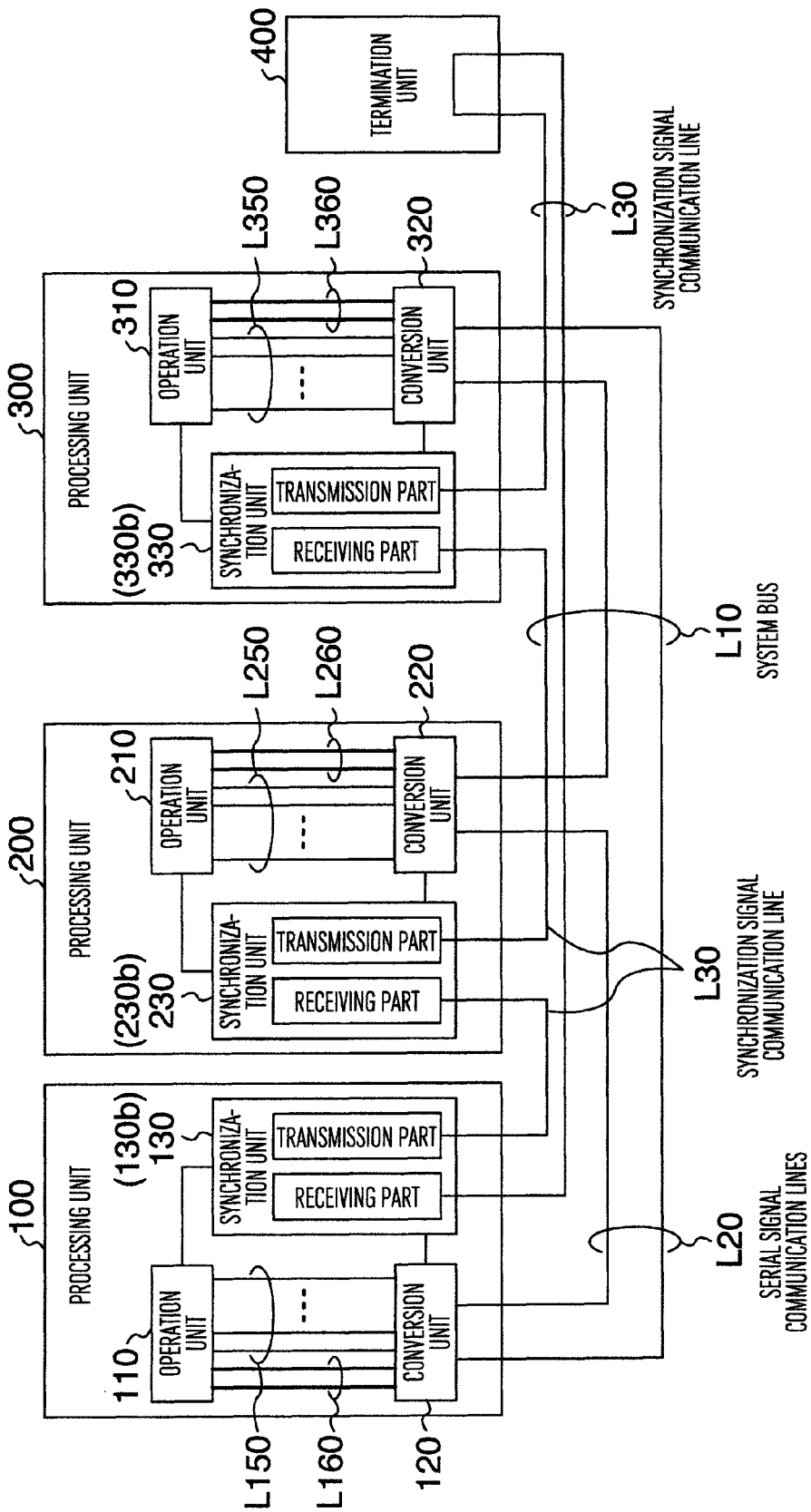
FIG. 6 is a diagram schematically illustrating a plurality of processing units having synchronization units connected in a ring in a second embodiment of the present invention.

The configuration of a process control system 1b according to the second embodiment is now described with reference to FIG. 6. The process control system 1b of FIG. 6 is different from the process control system 1 of FIG. 1 in that synchronization units 130b, 230b and 330b of the processing units 100, 200 and 300 include transmission parts and receiving parts and the synchronization signal control line L30 is connected through a termination unit 400 in a ring. However, the termination unit 400 is not necessarily required and when the termination unit 400 is not provided, the transmission part of the synchronization unit 330b may be connected to the receiving unit of the synchronization unit 130b. In FIG. 6, three processing units are provided, although two or four or more processing units may be provided. The same elements as those as FIG. 1 are given the same reference numerals and description thereof is omitted.

<Method of Setting Master Right>

It is supposed that the operation unit 110 of the processing unit 100 detects abnormal state in the processing unit 100 and supplies detection notification of abnormal state to the synchronization unit 130b. The transmission part of the synchronization unit 130b transmits the detection notification of abnormal state to the receiving part of the synchronization unit 230b through synchronization signal communication line L30. The detection notification of abnormal state is transferred in order of synchronization unit 130b→synchronization unit 230b→synchronization unit 330b→termination unit 400→synchronization unit 130b. When the detection notification of abnormal state transmitted by the synchronization unit 130b is returned to itself (the synchronization unit 130b), the synchronization unit 130b detects that all of other processing units 200 and 300 have received the detection notification of abnormal state. That is, the synchronization unit 130b recognizes that the synchronization unit 130b can get master right. Further, when the detection notification of abnormal state is not returned to the synchronization unit 130b itself, the synchronization unit 130b may retransmit the detection notification of abnormal state. When the synchronization unit 230b or 330b is a transmission source of detection notification of abnormal state, the synchronization unit 230b or 330b performs the same processing as that of the synchronization unit 130b.

The setting method of master right in the configuration of the second embodiments is described in detail with reference to FIGS. 7 to 9. It is supposed that signals outputted by the synchronization units 130b, 230b and 330b are transmitted in order.

Figure 7:
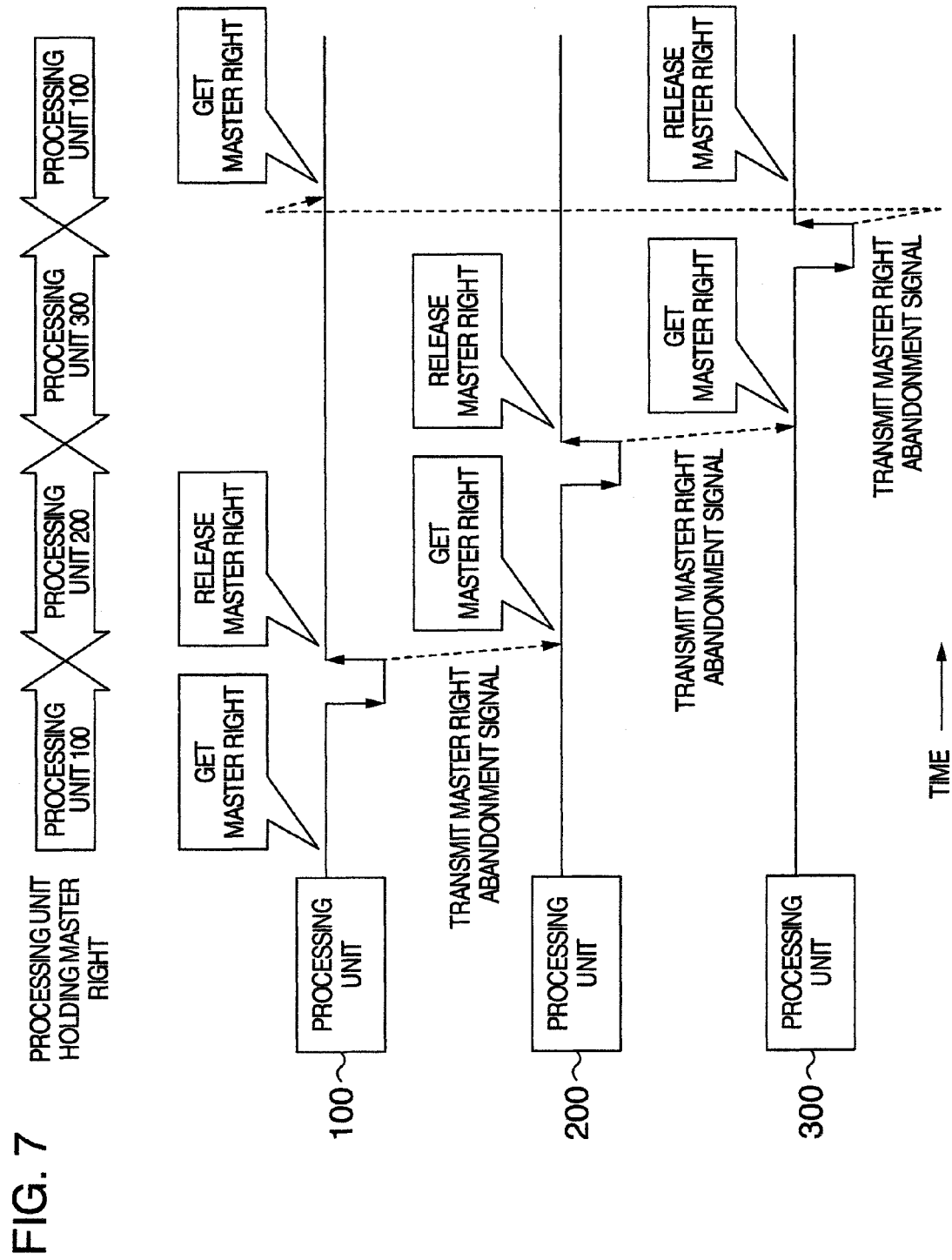
FIG. 7 is a diagram illustrating an example of a method of deciding a master right in the second embodiment.

FIG. 7 illustrates the method in which the processing units 100, 200 and 300 get the master right in order. First, the processing unit 100 which holds master right releases the master right after the lapse of predetermined time from acquisition of the master right. The release of master right is performed by transmitting predetermined waveform in order as shown in FIG. 7, for example. Furthermore, when the predetermined waveform indicating the release of master right is received, it is supposed that the master right is gotten. The predetermined time during which master right is held may be the same to all of the processing units 100, 200 and 300 or may be different. When it is not necessary to transmit detection notification of abnormal state at the time that master right is gotten, the master right may be released immediately.

Figure 8:
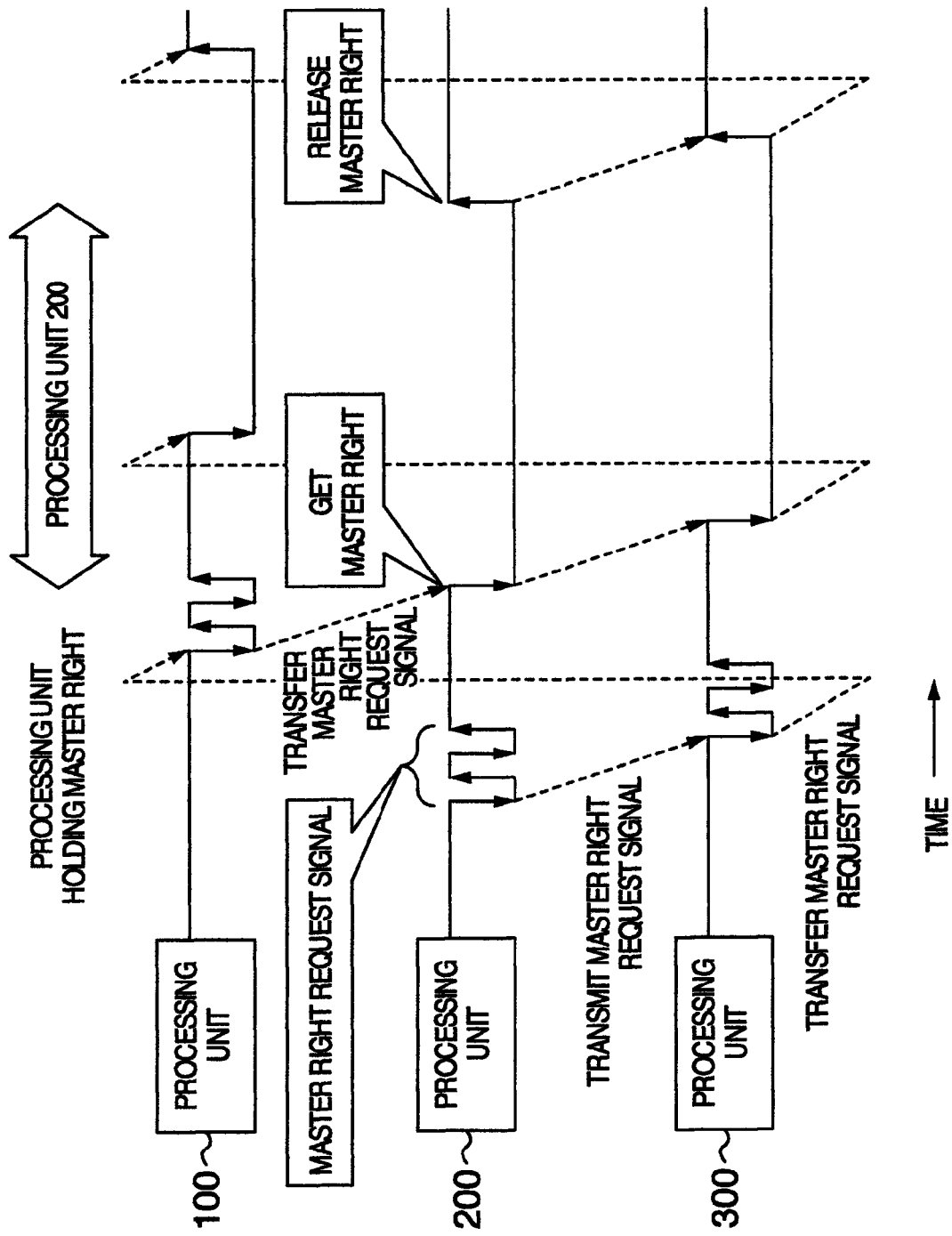
FIG. 8 is a diagram illustrating another example of a method of deciding a master right in the second embodiment.

In FIG. 8, it is supposed that the processing unit 200 in which the need to transmit detection notification of abnormal state arises outputs master right request signal for requesting master right, so that the outputted master right request signal is transferred in order and when the signal makes a round and is returned to the processing unit 200 itself, the processing unit 200 gets the master right. The processing unit 200 which has gotten master right changes polarity or level of signal on synchronization signal communication line L30 from high to low, for example. Other processing units 100 and 300 transfer the state of polarity or level in order. Further, it is supposed that the processing unit 200 holds master right while the polarity or level of signal on synchronization signal communication line L30 is low. When the processing unit 200 releases the master right, the processing unit 200 changes polarity or level of signal on synchronization signal communication line L30 from low to high. Other processing units 100 and 300 transfer the state of polarity or level in order and recognizes that master right is released.

Even if the processing unit 200 receives master right request signal of other processing units 100 and 300 while the processing unit 200 outputs the master right request signal and waits for the master right request signal returned to the processing unit 200 itself after a round, the processing unit 200 does not transfer the signal. When a plurality of processing units output master right request signals, competition can be avoided by shifting timing of retransmission of master right request signal or using the competition avoidance method described later. In FIG. 8, the processing unit 200 outputs the master right request signal, although even when other processing units 100 and 300 output the master right request signal, the same processing operation is performed.

Figure 9:
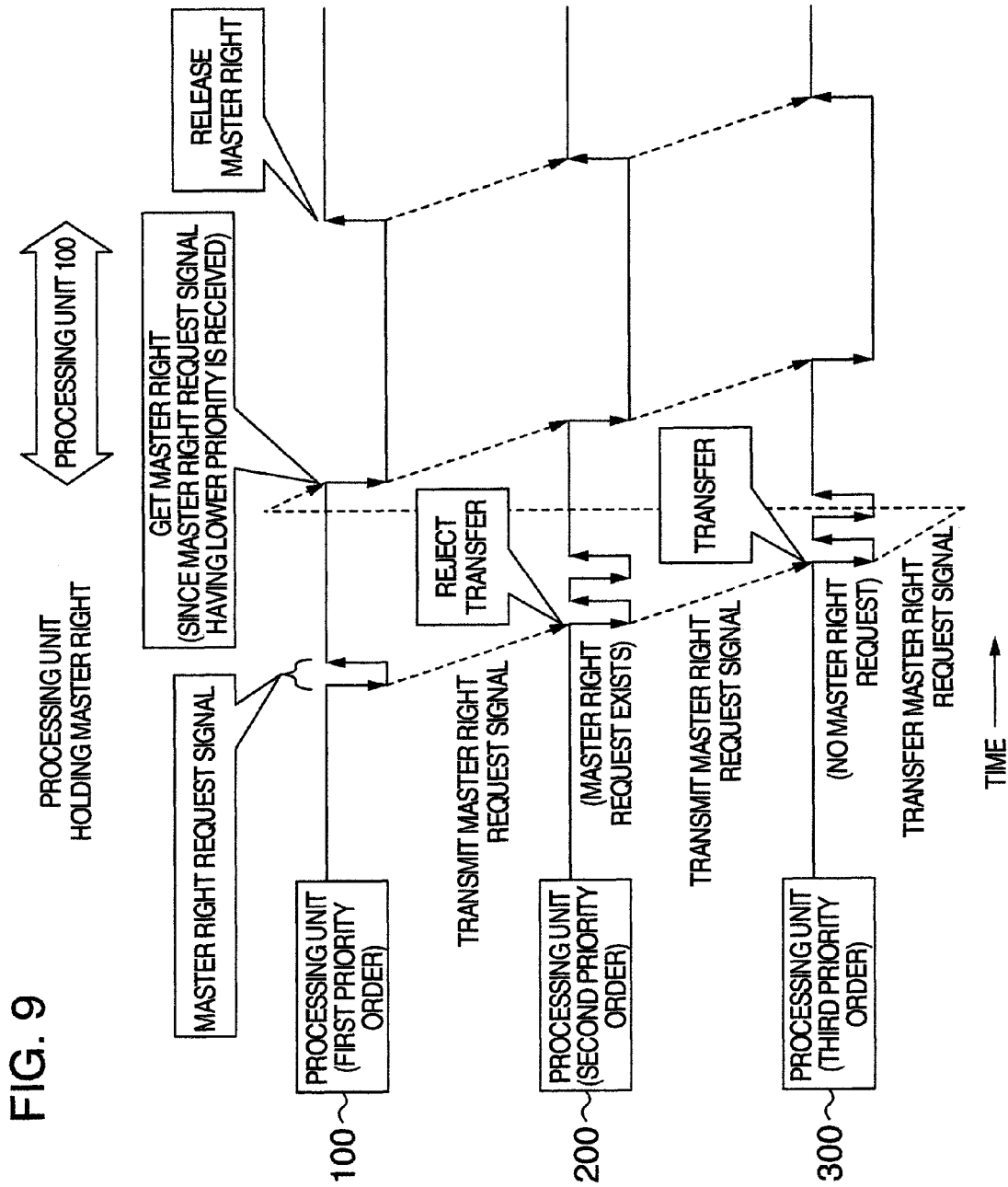
FIG. 9 is a diagram illustrating another example of a method of deciding a master right in the second embodiment.

Referring now to FIG. 9, another competition avoidance method different from that of FIGS. 7 and 8 is described. In the method shown in FIG. 9, priorities with which master right can be gotten are previously set in the processing units 100, 200 and 300. For example, it is supposed that the priorities of first, second and third orders are set to the processing units 100, 200 and 300 in order of description, respectively. First, the processing unit 100 in which the need to transmit detection notification of abnormal state arises outputs master right request signal for requesting master right to next processing unit 200 in order. The processing unit 200 also detects abnormal state and the need to request master right arises in the processing unit 200. Accordingly, the processing unit 200 refuses transfer of master right request signal of the processing unit 100 having higher priority order than the processing unit 200 itself and outputs its own master right request signal to next processing unit 300 in order.

The processing unit 300 is in the state that there is no need to request master right and accordingly when the processing unit 300 receives master right request signal of the processing unit 200, the processing unit 300 transfers the received master right request signal of the processing unit 200 to the next processing unit 100 in order. The processing unit 100 receives master right request signal of the processing unit 200 having lower priority order than that of the processing unit 100 itself and accordingly the processing unit 100 can recognize that the master right can be gotten. Further, the processing unit 200 receives master right request signal of the processing unit 100 having higher priority order than that of the processing unit 200 itself and accordingly the processing unit 200 can recognize that master right cannot be gotten.

In the method described with reference to FIG. 9, the processing units 100, 200 and 300 are required to memorize waveforms of master right request signals of all the processing units in association with priorities. Accordingly, in order to reduce memory capacity, the processing unit 100 having priority of first order uses one pulse formed of high→low→high and the processing unit 200 having priority of second order uses two pulses. That is, the number of pulses is set to be different in accordance with priority order, so that it is not required to memorize waveforms of master right request signals.

Third Embodiment

Figure 10:
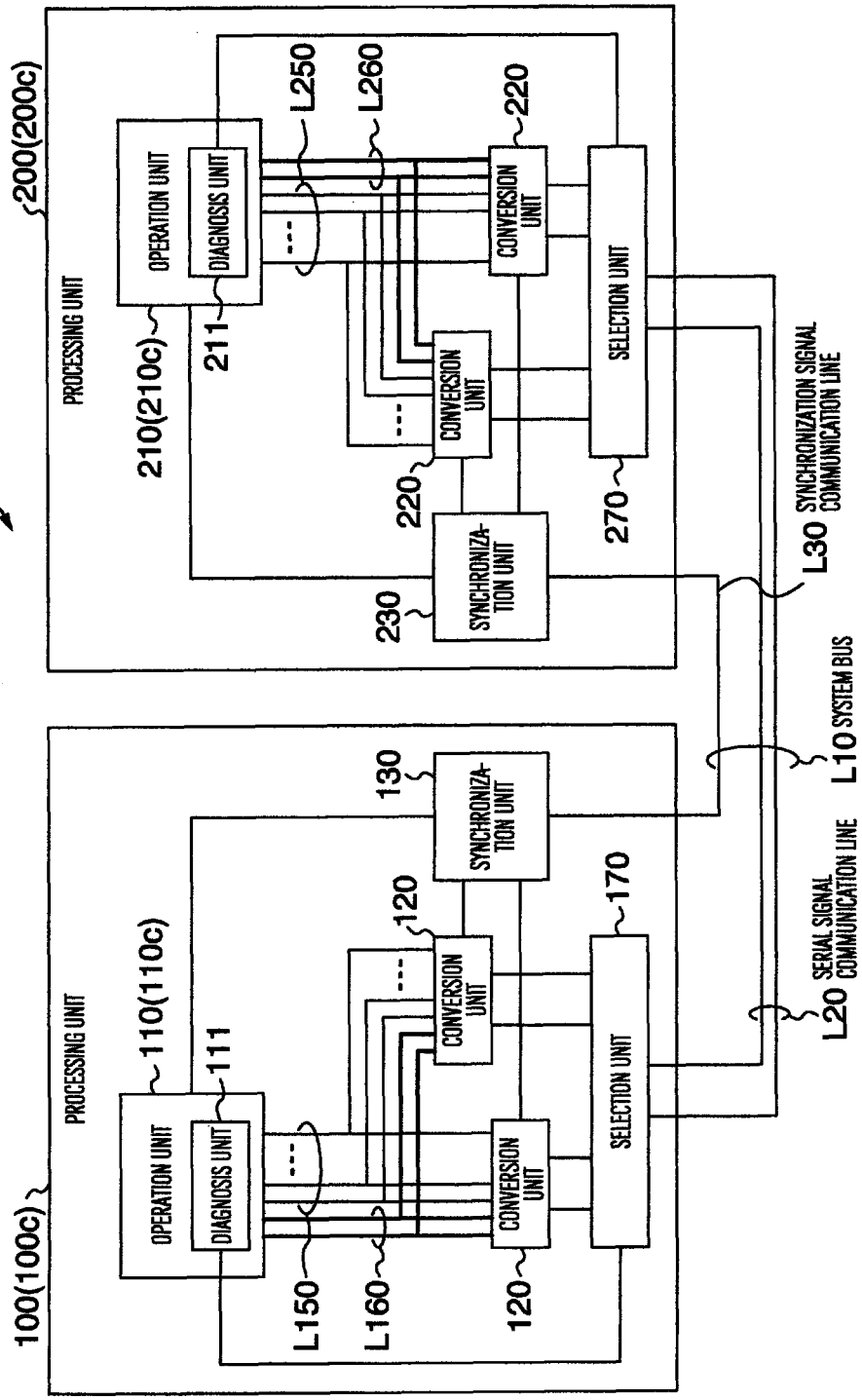
FIG. 10 is a diagram schematically illustrating an example of processing units including a plurality of conversion units in a third embodiment of the present invention.

The configuration of process control system 1c according to the third embodiment is now described with reference to FIG. 10. In FIG. 10, processing units 100c and 200c are connected by way of example, although processing unit 100c and 2 or more processing units 200c may be connected. The process control system 1c is different from the process control system 1 of the first embodiment in that a plurality of conversion units 120 are provided in processing unit 100c, a diagnosis unit 111 is provided in operation unit 110c and a selection unit 170 for selecting the conversion units 120 is provided. In FIG. 10, only 2 conversion units 120 are provided in the processing unit 100c, although 3 or more conversion units may be provided. The processing unit 200c has the same configuration as the processing unit 100c. In the process control system 1c, the same elements as those of the process control system 1 are given the same reference numerals and description thereof is omitted.

The diagnosis unit 111 supplies selection information indicating which conversion unit 120 is selected to be used to the selection unit 170 on the basis of diagnosis results collected from the plurality of conversion units 120. The selection unit 170 selects the conversion unit 120 on the basis of the selection information. Further, the selection unit 170 has data error check function such as parity and CRC (Cyclic Redundancy Check) and totalizes the number of errors and/or the error rate of parity errors and CRC errors during predetermined period. The selection unit 170 transmits the number of errors and/or the error rate to the diagnosis unit 111 as diagnosis result. The diagnosis unit 111 compares the diagnosis result with predetermined threshold value for diagnosis and when the diagnosis result exceeds the threshold, the diagnosis unit 11 judges that the conversion unit 120 is not normal and prevents the conversion unit 120 from being selected. Further, when the conversion unit 120 judged not to be normal is always used, the always used conversion unit 120 is replaced by another conversion unit 120 judged to be normal.

Figure 11:
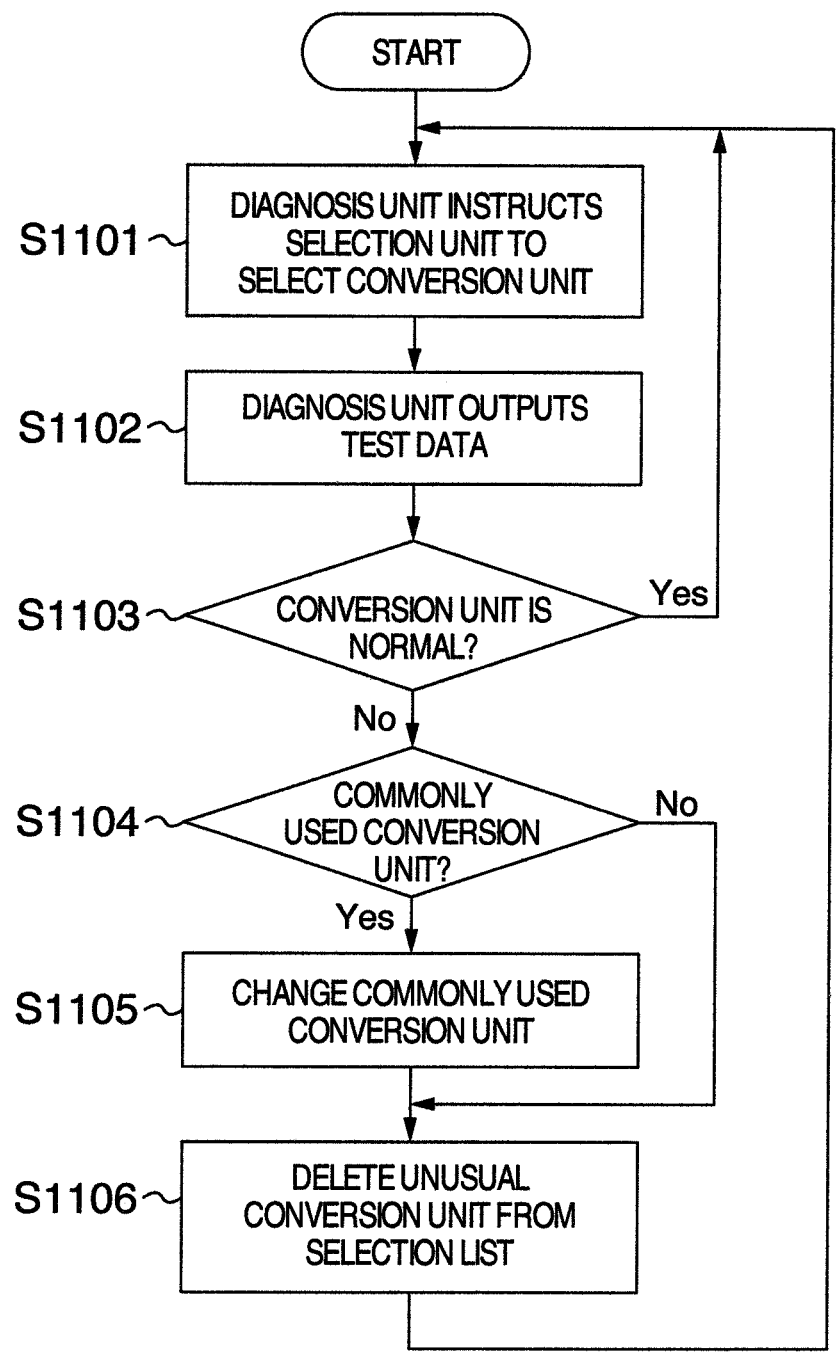
FIG. 11 is a flow chart showing an example of a method of selecting commonly used conversion unit in the processing of the third embodiment.

Referring now to FIG. 11, concrete processing flow is described by taking the processing unit 100c as an example. Even in the case of processing unit 200c, the same processing flow is attained. In step S1101, the diagnosis unit 111 instructs the selection unit 170 to select the conversion unit 120 to be diagnosed. The conversion unit 120 to be selected may be any one or plural in number. In step S1102, the diagnosis unit 111 supplies test data for diagnosis to the selected conversion unit 120 through general signal lines L150 and important signal lines L160. When abnormal state is detected, the important signal lines L160 are used and accordingly at least important signal lines L160 are always required to be diagnosed. The selection unit 170 which has received output of the conversion unit 120 which has received the test data for diagnosis returns diagnosis result to the diagnosis unit 111.

In step S1103, the diagnosis unit 111 compares diagnosis result with predetermined threshold to judge whether the selected conversion unit 120 is normal or not. When it is judged that the conversion unit 120 is normal (Yes of step S1103), processing is returned to step S1101. The diagnosis may be performed periodically or at any time when general signal lines L150 are not used. When it is judged that conversion unit 120 is not normal (No of step S1103), the diagnosis unit 111 judges whether the conversion unit 120 is a commonly used conversion unit 120 or not in step S1104.

When it is judged that the conversion unit 120 is a commonly used conversion unit 120 (Yes of step S1104), the diagnosis unit 111 refers to a selection list (not shown) in which a list of conversion units 120 judged to be normal is stored to select one conversion unit 120 from the selection list and replaces the commonly used conversion unit 120 by the selected conversion unit. When it is judged that the conversion unit 120 is not the commonly used conversion unit 120 (No of step S1104), processing of step S1105 is skipped. In step S1106, the diagnosis unit 111 deletes the conversion unit 120 judged not to be normal from the selection list. After processing of step S1106 is ended, processing is returned to step S1101. Registration of the conversion unit 120 repaired to be normal into the selection list is made by manager of process control system 1.

Fourth Embodiment

Figure 12:
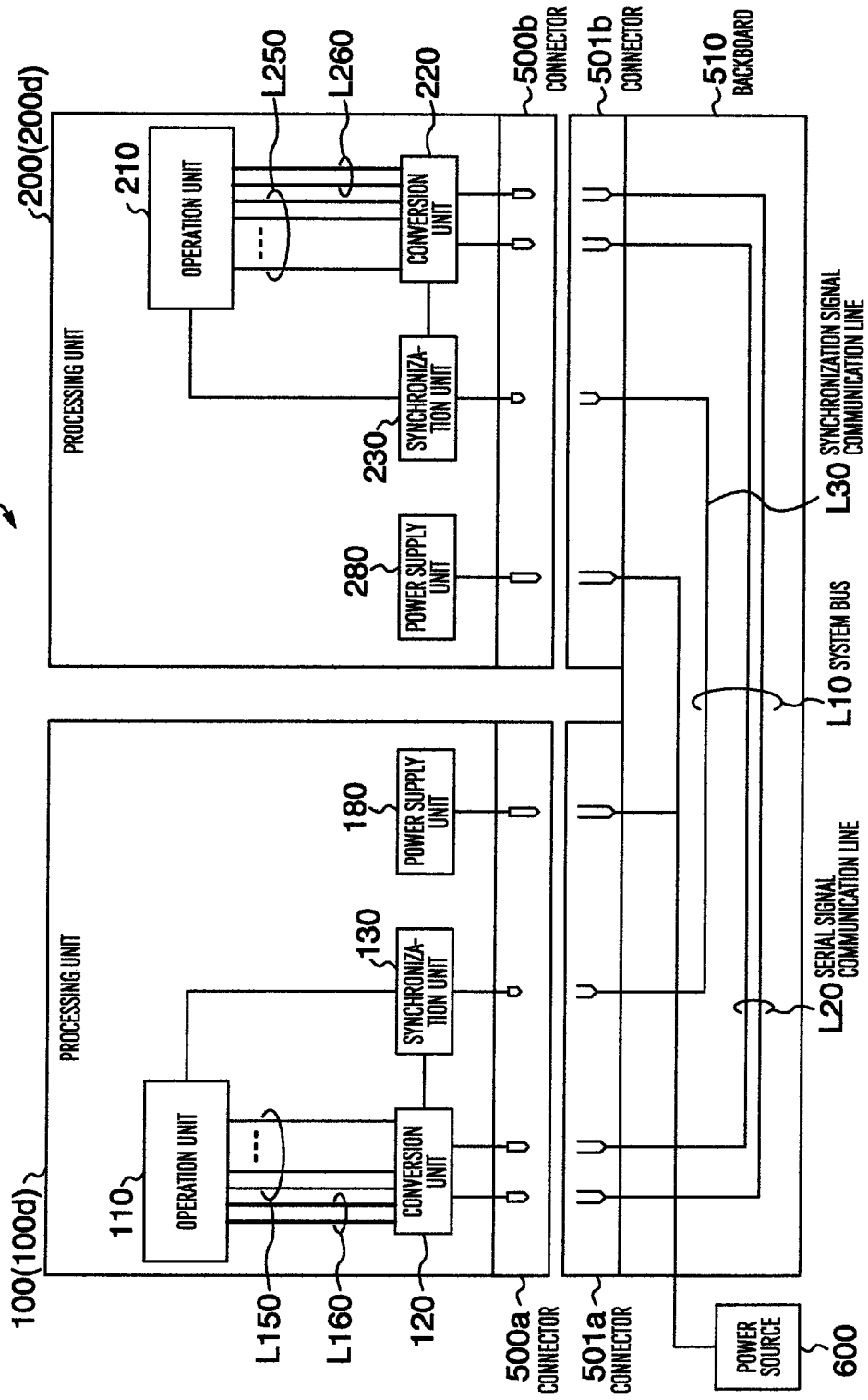
FIG. 12 is a diagram illustrating an example of a configuration for attaining hot plug in a fourth embodiment of the present invention.

In the fourth embodiment, the configuration of making hot plug of processing units 100d and 200d to system bus L10 possible is described with reference to FIG. 12. The process control system 1d of the fourth embodiment is different from the process control system 1 of the first embodiment in that power supply units 180 and 280 are provided in processing units 100d and 200d, connectors 500a, 500b, 501a and 501b and backboard 510 are provided and power source 600 for supply electric power to the power supply units 180 and 280 is provided. In the process control system 1d, the same elements as those of the process control system 1 are given the same reference numerals and description thereof is omitted. In FIG. 12, two processing units 100d and 200d are provided, although three or more processing units may be provided.

The power supply units 180 and 280 are supplied with electric power from the power source 600 and supply electric power to various parts of the processing unit 100d and 200d. The power source 600 is DC power supply such as battery or AC power supply such as commercial power supply. The connector 500a includes long and short pin plugs, each of which is connected to signal line of internal circuit of processing unit 100d. The connector 501a includes jacks corresponding to the pin plugs of the connector 500a and the jacks are connected to wiring on the backboard 510. The connector 500b includes long and short pin plugs similarly to connector 500a and the pin plugs are connected to signal lines of internal circuit of processing unit 200d. The connector 501b includes jacks corresponding to pin plugs of connector 500b similarly to connector 501a and the jacks are connected to wiring on the backboard 510. System bus L10 is provided on backboard 510 and connects between connectors 501a and 501b. The backboard 510 includes power line disposed on board thereof to supply electric power from power source 600 to power supply units 180 and 280.

In the connectors 500a and 500b, the longest pin plug is used as pin plug connected to power line of the power supply units 180 and 280. Accordingly, when the connectors 500a and 501a are connected, the power source 600 and the power supply unit 180 are connected first. Conversely, when the connector 500*a* is extracted from the connector 501*a*, the power supply unit 180 is separated from the power source 600 last. Pin pair having middle length is used as pin pair connected to the conversion unit 120 and shortest pin pair is used as pin pair connected to the synchronization unit 130. The same pin pairs as that of connectors 500*a* and 501*a* are used even in the pin pairs of connectors 500*b* and 501*b*.

The processing of attaining hot plug of processing unit 200*d* to system bus L10 during operation of processing unit 100*d* is described. When connector 500*b* of processing unit 200*d* is inserted into connector 501*b*, supply of power to internal circuit of processing unit 200*d* is started first. Thus, the operation unit 210, the conversion unit 220 and the synchronization unit 230 are initialized. At this time, in order to prevent that the conversion unit 220 and the synchronization unit 230 transmit abnormal signal to another processing unit 100*d*, the polarity or level of signal on synchronization signal communication line L30 is set to be low by default for input of synchronization unit 230.

When pin plug of synchronization unit 230 is connected to jack of backboard 510, the synchronization unit 230 receives signal of synchronization unit 130 transmitted by processing unit 100*d* through synchronization signal communication line L30. Next, the processing unit 200 notifies to processing unit 100*d* that the processing unit 200 itself is connected to system bus L10. For example, after the processing unit 200*d* operates synchronization unit 230 and gets master right as described in the first and second embodiments, the processing unit 200*d* operates conversion unit 220 and notifies to processing unit 100*d* that the processing unit 200*d* itself is connected to system bus L10.

When the processing unit 100*d* detects that processing unit 200*d* is inserted, the processing unit 100*d* is required to issue reset instruction, initialization instruction or the like to the processing unit 200*d*. Accordingly, for example, the processing unit 100*d* designates address of the processing unit 200*d* and transmits instruction through serial signal communication lines L20 by conversion unit 120. As another example, broadcast may be used to issue reset instruction, initialization instruction or the like to all processing units. When the processing unit 200*d* itself receives reset instruction, the processing unit 200*d* itself may neglect the instruction when initialization has been already made.

Processing for extracting the processing unit 200*d* during operation of the processing unit 100*d* is now described. When it is supposed that the processing unit 200*d* is previously extracted, operator operates switch or the like of the processing unit 200*d* to end processing of conversion unit 220 and set state of pin connected externally to be stable and then disconnect the power supply unit 280 and the power source 600 finally (after potential or current is set to predetermined value to prevent sudden current from flowing). Thus, the processing unit 200*d* can be extracted safely.

Next, processing example in case where the processing unit 200*d* is extracted unexpectedly is described about the case where the processing unit 200*d* does not get master right and the case where the processing unit 200*d* has gotten master right.

When the processing unit 200*d* does not get master right, synchronization unit 230 can detect abnormal state before pin pair of conversion unit 220 is separated by extinction of signal supplied to synchronization unit 230 by separating pin pair of synchronization unit 230 itself. The synchronization unit 230 which has detected abnormal state notifies the abnormal state to operation unit 210 and the operation unit 210 notifies detection notification of abnormal state to conversion unit 220 through synchronization unit 230. The conversion unit 220 stops processing immediately and sets state of pin connected outside to be stable state. Thereafter, pin pair of conversion unit 220 is separated and pin pair of power supply unit 280 is separated. Accordingly, the processing unit 200*d* can be extracted safely.

Next, the case where the processing unit 200*d* has gotten master right when the processing unit 200*d* is extracted is described. In this case, since unexpected disturbance of signal waveform or change of state occurs in synchronization signal communication line L30, another processing unit 100*d* can understand that abnormality occurs on the side of master. For example, polarity or level of signal on synchronization signal communication line L30 changes from high to low. Accordingly, as described in the first and second embodiments, another processing unit 100*d* change the processing method of conversion unit 120 and waits to receive emergency data from processing unit 200*d* having master right. However, since conversion unit 220 of processing unit 200*d* has been extracted, another processing unit 100*d* cannot receive emergency data through serial signal communication lines L20. Accordingly, another processing unit 100*d* judges that the processing unit 200*d* has been extracted after the lapse of predetermined time.

As described above, in the first embodiment, the processing unit 100 which has detected abnormal state can transmit detection notification of abnormal state to other processing units 200 and 300 through synchronization signal communication line L30 immediately and can transmit emergency data such as trouble information to other processing units 200 and 300 through important signal lines L160 and serial signal communication lines L20. Accordingly, soundness among processing units 100, 200 and 300 connected to the system bus L10 can be ensured. Further, in the second embodiment, since competition of master right representing right to transmit detection notification of abnormal state can be avoided, soundness among processing unit 100, 200 and 300 can be ensured. In the third embodiment, conversion units 120 are multiplexed to select normal conversion unit 120, so that soundness among processing unit 100*c* and 200*c* can be ensured. In the fourth embodiment, since connection order of internal circuits of processing units 100*d* and 200*d* can be differentiated to thereby attain hot plug to system bus L10 safely, soundness among processing units 100*d* and 200*d* can be ensured.

In the first embodiment, the operation unit 110 notifies detection notification of abnormal state to conversion unit 120 through synchronization unit 130, although detection notification of abnormal state may be notified through general signal lines L150 or important signal lines L160. Further, the important signal lines L160 may be connected between operation unit 110 and synchronization unit 130 to transmit detection notification of abnormal state to synchronization unit 130. However, when the important signal lines L160 are composed of a plurality of signal lines, signal conversion such as logical sum of signals on these signal lines may be made to be used as detection notification of abnormal state.

In the third embodiment, the diagnosis unit 111 is provided in operation unit 110*c*, although the diagnosis unit 111 may be provided in selection unit 170. In this case, the diagnosis unit 111 transmits test data for diagnosis to operation unit 110 having data error check function and receives its diagnosis result from operation unit 110*c* to judge whether conversion unit 120 is normal or abnormal. Further, the diagnosis unit 111 may be provided in conversion unit 120. In this case, the diagnosis unit 111 transmits test data for diagnosis to operation unit 110*c* having data error check function and selection unit 170 and receives its diagnosis result to judge whether signal line is normal or abnormal. Further, the diagnosis unit 111 uses test data to judge whether conversion function of diagnosis unit itself is normal or abnormal.

In the fourth embodiment, the case where the synchronization unit 230 gets master right has been described, although a method using conversion unit 220 is also realizable. For example, when the processing unit 200d is connected to system bus L10, the synchronization unit 230 receives signal of synchronization unit 130 transmitted by processing unit 100d through synchronization signal communication unit L30 when the synchronization unit 230 is connected to system bus L10. The synchronization unit 230 notifies to conversion unit 220 that communication through serial signal communication line L20 has been prepared. The conversion unit 220 transmits data to the effect that master right is requested through processing unit 100d and serial signal communication lines L20 to get master right and notifies to the processing unit 100d that processing unit 200d itself is connected to system bus L10. In order to get master right, publicly known serial communication technique such as, for example, I2C (Inter-Integrated Circuit) bus (registered trademark) and SMBus (System Management Bus) (registered trademark) can be used. Furthermore, when conversion unit 220 does not include means for getting master right, it may be detected that processing unit 200d is connected by means of monitoring system using polling from processing unit 100d.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A processing unit including an operation unit to execute operation processing, wherein
the processing unit is connected to another processing unit through system bus including serial signal communication line and synchronization signal communication line to be able to communicate therewith and
the processing unit comprises:
a synchronization unit to transmit, when the operation unit detects abnormal state in the processing unit, notification of detection of the abnormal state received from the operation unit to the other processing unit through the synchronization signal communication line and to supply the detection notification of abnormal state to a conversion unit; and
the conversion unit to receive, when the detection notification of abnormal state is not received from the synchronization unit, data of operation processing result from the operation unit by parallel communication and to receive, when the detection notification of abnormal state is received from the synchronization unit, emergency data from the operation unit through important signal line for parallel communication different from signal line used for the parallel communication by parallel communication, the conversion unit converting the received parallel signal into serial signal to transmit the serial signal to the other processing unit through the serial signal communication line in any case.

2. The processing unit according to claim 1, wherein
the synchronization unit further supplies the detection notification of abnormal state received from the other processing unit through the synchronization signal communication line to the conversion unit and the operation unit, and
the conversion unit further converts serial signal received from the other processing unit through the serial signal communication line into parallel signal and supplies the converted parallel signal to the operation unit by parallel communication when the detection notification of abnormal state is not received, the conversion unit supplying the converted parallel signal to the operation unit through the important signal line when the detection notification of abnormal state is received.

3. The processing unit according to claim 1, wherein
the conversion unit further connects the serial signal communication line and the important signal line directly when the detection notification of abnormal state is received and performs parallel communication with the other processing unit.

4. The processing unit according to claim 1, wherein
the conversion unit transmits data received through the important signal line through the serial signal communication line by broadcast when the detection notification of abnormal state is received.

5. The processing unit according to claim 1, wherein
the synchronization unit includes
receiving means to receive signal waveform of the detection notification of abnormal state outputted from the synchronization unit itself onto the synchronization signal communication line and
a waveform comparison unit to produce combined waveform obtained by combining output signal waveform of the synchronization unit itself received by the receiving means with signal waveform of the detection notification of abnormal state of the other processing unit received from the synchronization signal communication line and compare the combined waveform with the output signal waveform,
the synchronization unit judging that right to transmit data can be gotten and transmitting data to the other processing unit through the serial signal communication line when the waveform comparison unit judges that the combined waveform is similar to the output signal waveform of the synchronization unit itself,
the synchronization unit differentiating timing that the detection notification of abnormal state is transmitted in accordance with position of signal waveform judged that the output signal waveform of the synchronization unit itself is different from the signal waveform received from the synchronization signal communication line and repeatedly transmitting the detection notification of abnormal state until it is judged that the combined waveform is similar to the output signal waveform of the synchronization unit itself when the waveform comparison unit judges that the combined waveform is not similar to the output signal waveform of the synchronization unit itself.

6. The processing unit according to claim 1, wherein
the synchronization unit includes a transmission part to transmit the detection notification of abnormal state onto the synchronization signal communication line and a receiving part to receive the detection notification of abnormal state from the synchronization signal communication line, and
the transmission part is connected to the receiving part of the synchronization unit of the other processing unit through the synchronization signal communication line and the receiving part is connected to the transmission part of the synchronization unit of the other processing unit through the synchronization signal communication line to have the synchronization signal communication line formed in a ring.

7. The processing unit according to claim 6, wherein the synchronization unit of the processing unit and the synchronization unit of the other processing unit transmit the detection notification of abnormal state through the synchronization signal communication line in order and when the synchronization unit of the processing unit receives the detection notification of abnormal state outputted by the synchronization unit itself from the other processing unit, the synchronization unit stops transmitting the received detection notification of abnormal state in order and judges that master right representing right to transmit data through the serial signal communication line can be gotten.

8. The processing unit according to claim 6, wherein when the synchronization unit gets master right representing right to transmit data through the serial signal communication line, the synchronization unit transmits master right abandonment signal representing abandonment of the master right through the synchronization signal communication line in order, and the synchronization unit which has received the master right abandonment signal judges that the master right can be gotten.

9. The processing unit according to claim 6, wherein the synchronization unit includes function of transmitting master right request signal which is unique for each processing unit and requests master right through the synchronization signal communication line, function of transferring the received master right request signal to next processing unit in order when the maser right is not requested to be gotten, function of selecting whether the master right request signal received from the other processing unit is transferred or is refused to be transferred on the basis of priority previously determined in a corresponding manner to the master right request signal when the master right is requested to be gotten and transmitting the master right request signal of the processing unit to which the synchronization unit itself belongs to the next processing unit when the transfer is refused, and function of judging that transmission right is gotten in accordance with priority of received master right request signal and priority of the master right request signal of the processing unit to which the synchronization unit itself belongs.

10. The processing unit according to claim 1, wherein the processing unit includes 2 or more conversion units and diagnoses operation of the conversion units to select the conversion unit which operates normally to be used.

11. The processing unit according to claim 10, wherein the processing unit includes a diagnosis unit which supplies diagnosis information for diagnosing operation of the conversion unit to the conversion unit and receives processing result of the diagnosis information processed by the conversion unit to judge whether operation of the conversion unit is normal or not and the conversion unit judged by the diagnosis unit that operation thereof is normal is selected to be used.

12. The processing unit according to claim 1, wherein the processing unit further includes a power supply unit to supply electric power to the processing unit and the processing unit and the other processing unit are connectable to external power source, provided with electric power line for supplying electric power to the power supply unit, the serial signal communication line and the synchronization signal communication line are provided, and connected by a connector including pair of long pins which come into contact with each other first at the time of insertion and are separated from each other last at the time of extraction and pair of short pins which come into contact with each other later than the long pins at the time of insertion and are separated from each other earlier than the long pins at the time of extraction, the power supply unit being connected through the pair of long pins and the conversion unit and the synchronization unit being connected through the pair of short pins, the processing unit performing, when the processing unit is connected to the connector to which the other processing unit is connected, initialization for setting potential or current of the short pins to stable state when electric power is supplied to the power supply unit through the pair of long pins, the processing unit stopping operation of the synchronization unit and the conversion unit to set potential or current of the short pins to stable state when the processing unit is separated from the connector to which the other processing unit is connected.

13. A process control system including the processing unit, the other processing unit and the connector as set forth in claim 12, wherein when the processing unit is connected to the connector to which the other processing unit is connected, the synchronization unit of the processing unit transmits master right request signal for requesting to get master right representing right to transmit data through the serial signal communication line to the other processing unit to thereby transmit to the other processing unit that the processing unit has been connected and when the processing unit is separated from the connector to which the other processing unit is connected, the other processing unit detects occurrence of abnormality of signal on the synchronization signal communication line to thereby recognize that the processing unit has been separated.

14. A control method used in a processing unit including an operation unit to execute operation processing, wherein the processing unit is connected to another processing unit through a system bus including a serial signal communication line and synchronization signal communication line to be able to communicate therewith and the processing unit comprises a synchronization unit and a conversion unit, and the method comprises:

transmitting, via the synchronization unit, when the operation unit detects an abnormal state in the processing unit, notification of detection of the abnormal state received from the operation unit to the other processing unit through the synchronization signal communication line, and supplying the detection notification of abnormal state to the conversion unit; and receiving, via the conversion unit, when the detection notification of abnormal state is not received from the synchronization unit, data of operation processing result from the operation unit by parallel communication, and receiving, when the detection notification of abnormal state is received from the synchronization unit, data of operation processing result from the operation unit through an important signal line for parallel communication different from a signal line used for the parallel communication by parallel communication, converting the received parallel signal into a serial signal, and transmitting the serial signal to the other processing unit through the serial signal communication line in any case, supplying, via the operation unit, when the operation unit detects abnormal state in the processing unit, detection notification of abnormal state to the synchronization unit and data to the conversion unit through the important signal line, transmitting, via the synchronization unit, the detection notification of abnormal state received from the operation unit to the other operation unit through the synchronization signal communication line and supplying it to the conversion unit, and receiving, via the conversion unit, the detection notification of abnormal state and receiving data from the operation unit through the important signal line to have the received data transmitted to the other processing unit through the serial signal communication line.

15. The control method according to claim 14, wherein transmitting, via a transmission part included in the synchronization unit, the detection notification of abnormal state to the synchronization signal communication line and a receiving part to receive the detection notification of abnormal state from the synchronization signal communication line, and wherein the transmission part is connected to the receiving part of the synchronization unit of the other processing unit through the synchronization signal communication line, and the receiving part is connected to the transmission part of the synchronization unit of the other processing unit through the synchronization signal communication line, to have the synchronization signal communication line formed in a ring.

16. The control method according to claim 14, comprising:

including a power supply unit in the processing unit, to supply electric power to the processing unit, and providing the processing unit and the other processing unit as being connectable to external power source, provided with electric power line for supplying electric power to the power supply unit, wiring the serial signal communication line and the synchronization signal communication line to be connected by a connector including: pair of long pins which come into contact with each other first at the time of insertion and which are separated from each other last at the time of extraction; and pair of short pins which come into contact with each other later than the long pins at the time of insertion, and are separated from each other earlier than the long pins at the time of extraction, wherein the power supply unit being connected through the pair of long pins, and the conversion unit and the synchronization unit being connected through the pair of short pins, the method further comprising:

performing, via the processing unit, when the processing unit is connected to the connector to which the other processing unit is connected, initialization for setting potential or current of the short pins to stable state when electric power is supplied to the power supply unit through the pair of long pins, and stopping operation of the synchronization unit and the conversion unit, via the processing unit, to set potential or current of the short pins to stable state when the processing unit is separated from the connector to which the other processing unit is connected.

* * * * *